United States Patent
Wunsch

(10) Patent No.: US 7,287,096 B2
(45) Date of Patent: Oct. 23, 2007

(54) METHOD FOR ROBUST, FLEXIBLE RECONFIGURATION OF TRANSCEIVE PARAMETERS FOR COMMUNICATION SYSTEMS

(75) Inventor: Grant Wunsch, Nevada City, CA (US)

(73) Assignee: Texas Instruments Incorporated, Dallas, TX (US)

( * ) Notice: Subject to any disclaimer, the term of this patent is extended or adjusted under 35 U.S.C. 154(b) by 509 days.

(21) Appl. No.: 10/034,145

(22) Filed: Dec. 28, 2001

(65) Prior Publication Data

US 2002/0172188 A1 Nov. 21, 2002

Related U.S. Application Data

(60) Provisional application No. 60/291,992, filed on May 19, 2001.

(51) Int. Cl.
*G06F 15/16* (2006.01)
(52) U.S. Cl. .................. 709/248; 709/220; 709/221
(58) Field of Classification Search .................. 709/248
See application file for complete search history.

(56) References Cited

U.S. PATENT DOCUMENTS

| 5,400,322 A | 3/1995 | Hunt et al. |
| 5,479,447 A | 12/1995 | Chow et al. |
| 6,829,307 B1 * | 12/2004 | Hoo et al. .................. 375/260 |

OTHER PUBLICATIONS

Aware, Inc.; "Proposed working text for Seamless Rate Adaptation (SRA) for G.dmt.bis and G.lite.bis;" ITU—Telecommunication Standardization Sector, BA-087, Jun. 19-23, 2000, pp. 1-6, Antwerp.

Texas Instruments; "G.voice, G.dmt.bis, G.lite.bis: Proposal for Seamless Dynamic Rate Repartition for CVoDSL;" ITU—Telecommunication Standardization Sector, IC-079, Apr. 9-13, 2001, pp. 1-8, Irvine, California.

Texas Instruments; "G.gen: G.dmt.bis: G.lite.bis: Refining the On-line Reconfiguration Protocol;" ITU—Telecommunication Standardization Sector, RN-094, May 21-25, 2001, pp. 1-4, Redbank, New Jersey.

* cited by examiner

*Primary Examiner*—Yves Dalencourt
(74) *Attorney, Agent, or Firm*—Tum Thach; W. James Brady; Frederick J. Telecky, Jr.

(57) ABSTRACT

A communications system 400 includes a transmitter 410 that transmits information to a receiver 440 over communication channels 420 and 430. The receiver 440 determines reconfiguration transceive parameters, ack/comply timing information and implementation timing information and provides this information to the transmitter 410, e.g., over an OAM channel 420. The transmitter 410 returns an ack/comply to the receiver 440, e.g., over a lower layer OAM channel 430, at a time in accordance with the ack/comply timing information. If the acknowledgment indicates acceptance of the reconfiguration transceive parameters, both the transmitter 410 and the receiver 440 implement the reconfiguration transceive parameters at a time in accordance with the implementation delay timing information.

32 Claims, 6 Drawing Sheets

US 7,287,096 B2

METHOD FOR ROBUST, FLEXIBLE RECONFIGURATION OF TRANSCEIVE PARAMETERS FOR COMMUNICATION SYSTEMS

This patent claims the benefit of provisionally filed patent application Ser. No. 60/291,992, filed May 19, 2001, which is incorporated herein by reference.

FIELD OF THE INVENTION

This invention relates generally to communication systems, and more particularly to a method for robust, flexible reconfiguration of transceive parameters for communication systems.

BACKGROUND OF THE INVENTION

DSL (digital subscriber line) applications, such as ADSL (asymmetrical digital subscriber line) are an important part of the present telecommunications infrastructure, and there is ever reason to believe that DSL's significance will only continue to increase. Many protocols have been suggested to help more efficiently and accurately transmit and process data in the DSL systems. The world standards for ADSL are defined in ITU 992.1 and 992.2, each of which is incorporated herein by reference.

One such protocol deals with a concept known as "bit swapping." Bit swapping is a process or protocol for multiple carriers in a transmission line, as opposed to a single carrier. Bit swapping occurs when a transceiver decides to switch (or alter) the transmission of data from one carrier to a second carrier, for such reasons as noise, etc.

Bit swap or other modifications to the transceive parameters can be applied during normal operation to compensate for changes to the communication channel, caused by many things such as changes in loop temperature, network traffic. Referring to FIG. 6, the receiver in transceiver B monitors some measure of the relative error performance of each of the received carriers in a multi-carrier modulation such as is used in ADSL. If the receiver in transceiver B determines that a change is desirable, e.g. to decrease the overall error level, then transceiver B sends a request message that contains the proposed change to transceiver parameters to transceiver A, which sends an acknowledge/will comply (hereafter called ack/comply message) back to the transceiver B if it wishes to make the requested change.

A protocol for this using an operations and management (OAM) overhead channel for the request and ack/comply messages is described in U.S. Pat. No. 5,479,447, incorporated herein by reference. With this protocol, the reconfiguration of transceive parameters (the bit swaps) are synchronized between transceiver A transmitter and transceiver B receiver by having the new parameters become effective a fixed number of data symbols following the ack/comply message.

A modified protocol is described in U.S. Pat. No. 5,400,322, incorporated herein by reference. This protocol requires that both transceivers A and B count transmitted and received data symbols, i.e., transceiver A counts the data symbols it transmits and counts the data symbols it receives; transceiver B does similarly. The bit swap ack/comply message sent by transceiver A contains a data symbol count (technically, a superframe count identification) that tells transceiver B, which receive data symbol, is the first use the new transceive parameters (bit swap). The protocol allows for the overhead messages to be sent repeatedly as a way of reducing the chance that the message is either not received or that the message is not received correctly. The current generation of ADSL equipment uses a scheme based on this protocol.

Another method, proposed for ADSL equipment does not use the OAM channel for the ack/comply message. Instead, sending a particular bit pattern, sometimes called the Sync Flag, in place of the normal Sync Symbol indicates the ack/comply message. The Sync Symbol is a predetermined bit pattern, applied to 4QAM constellations on the carriers, that normally is sent every 69 data symbols for purpose of transceiver synchronization. Sixty-nine data symbols, with the last symbol being the Sync Symbol, form a superframe. Occurrence of the Sync Flag in place of the Sync Symbol instructs transceiver B to begin using new transceive parameters with the first data symbol following the Sync Flag symbol.

A simple framework for communications systems in general is useful for describing functionality as well as for comparing methods and protocols. Communication systems are often described and/or implemented in a layered way. The Open Systems Interconnection (OSI) reference model is one such way of layering and is used in this document. The lowest layer, sometimes called the physical media dependent (PMD) layer, is the layer where bits of information are transformed by the transmitter into modulations of physical properties such as voltage and current on the physical media (e.g., the wire pair loop) and transformed back into bits at the other end. The PMD layer typically includes functions such as symbol timing generation and recovery, encoding and decoding, modulation and demodulation, echo cancellation (if implemented) and line equalization, link startup, and physical layer overhead (superframing). A higher layer, sometimes called the PMS-TC (Physical Media Specific-Transmission Convergence) layer, typically includes functions such as the data framing, frame synchronization, error correction, error detection, data scrambling, and data descrambling. Generally, operation and maintenance information, if it is transmitted across the channel, is done via an interface to the PMS-TC or higher layer, rather than directly to the PMD layer, because the PMD layer is not a convenient interface for variable length, multi-bit messages. FIG. 7 illustrates a communications system and the PMD and PMS-TC layers.

The layered model described above is now applied to ADSL. The current generation of ADSL equipment typically uses the two-wire telephone cable (the loop) as the physical media. In ADSL, the Sync Symbol and Sync Flag replacement for Sync Symbol are PMD layer signals, meaning that each corresponds to a specific physical signal put onto the loop. The PMS-TC layer provides the OAM overhead channel. User data derives from a hierarchy of higher layers that feed data to the PMS-TC layer. Additionally, a transceiver management layer provides interface protocol for the OAM provided by the PMS-TC.

Typical multi-carrier or ADSL transceive parameters to reconfigure, such as the number of bits per carrier, gain of carrier, and the order of the data applied to carrier, are closely associated with the PMD layer. Changing these parameters must be data frame synchronous at both transceivers; otherwise the connection is at risk to fail.

In ADSL, the OAM overhead channel has some embedded error checking and error mitigation functionality. Additionally, the error correcting and detection capabilities of the PMS-TC layer are applied to OAM data. Normally, this would be a reasonably reliable protocol. However, a fairly typical situation for reconfiguration is when receiver in transceiver B is experiencing higher than normal errors such that a clear OAM overhead message cannot reliably be received. This increased error event is what can trigger a receiver to want to reconfigure in order to bring the errors back to a normal level. Therefore, for this situation, it is desirable to increase the reliability of the reconfiguration ack/comply as this is a message that transceiver A will assume that transceiver B will correctly receive.

In current generation ADSL equipment, the ack/comply message is sent by transceiver A over the OAM overhead channel, and the message is repeated several times in succession to increase the reliability that the message will be correctly received by transceiver B receiver. However, it can be demonstrated in practice that in typical situations, the receiver can miss the ack/comply message. In such an event, transceiver A switches to new transceiver transmit parameters but transceiver B does not switch to corresponding receive parameters. This causes errors in the link that degrade performance, often requiring the equipment to leave ShowTime and retrain.

CRC (cyclic redundancy code) error detection employed by the transceivers does not prevent this problem. The CRC is used to detect if there are errors but not to correct errors. It is possible to improve the protocol over OAM but it would require adding additional messaging between transceivers, which would take more time, and would still not provide sufficient reliability.

SUMMARY OF THE INVENTION

In one aspect, the present invention provides a novel combination of two known methods plus an additional parameter. The preferred embodiment uses a physical media dependent (PMD) "Synchronization Flag" or synch flag to specify if and when to reconfigure in combination with an overhead message that specifies the specific ADSL PMD superframe in which the synch flag will reside, as well as specifying the transceive parameters of the proposed new configuration. An additional parameter is included in the overhead message that the receiver can use to allow simpler, less costly implementation.

A communications system includes a transmitter that transmits information to a receiver over a communication channel. The receiver determines reconfiguration transceive parameters, ack/comply timing information and implementation timing information and provides this information in a reconfiguration request to the transmitter, e.g., over an OAM channel. The transmitter returns an ack/comply to the receiver, e.g., using a PMD signal, at a time in accordance with the ack/comply timing information. If the ack/comply indicates acceptance of the reconfiguration transceive parameters, both the transmitter and the receiver implement the reconfiguration transceive parameters at a time in accordance with the implementation delay timing information.

In one aspect, the present invention provides a method of sharing communication reconfiguration information in a communication system. Reconfiguration transceive parameters for indicating a request for reconfiguration of a data communication channel are determined, for example, at a receiver. Ack/comply timing information is also determined. This information indicates a time at which an ack/comply is expected. These parameters are transmitted, e.g., over an OAM channel, in a reconfiguration request. An ack/comply is then received, e.g., via a PMD signal over a communication channel. The ack/comply indicates whether reconfiguration transceive parameters are to be implemented.

Preferably, the ack/comply is received at a time determined by the ack/comply timing information.

The preferred embodiment of the invention improves the ability for ADSL equipment to reconfigure transceive parameters during normal "showtime" operation. Currently, existing procedures and potential reconfiguration procedures being discussed in ITU-T standards group suffer from one or more of the following: not robust, limited flexibility of the type of reconfiguration that is possible, and excessive implementation requirements on the equipment. Certain aspects of this invention provide ways to improve the reconfiguration protocol to positively affect one or more of the areas mentioned above. This protocol invention may be applicable to other types of modems and networking equipment as well.

The Sync Flag PMD signal for ack/comply provides improvements in dealing with errors (as analyzed with Gaussian noise on the loop as the dominant cause of errors). Since the Sync Flag is a PMD layer signal, the error detection and correction functionalities of the PMS-TC are not present. The Sync Flag is defined as a specific bit pattern that is maximally different or near maximally different from the bit pattern of the normal Sync Symbol. This great difference is what provides the improved reliability. However, even the Sync Flag is susceptible to misdetection (i.e., not detecting a transmitted Sync Flag or detecting a Sync Flag when one was not sent) in some situations. For example, a sufficiently large noise impulse on the loop during a Sync Symbol period can cause misdetection of the Sync Flag. Such noise impulses are known to occur, as demonstrated by U.S. ADSL Standard T1.413 Issue 2 Annex I.

Another benefit of using a PMD layer signal is its preciseness in time. A general rule of thumb says that the higher the communication layer, the less precise the events are in time. We can precisely define when the Sync Flag is transmitted and within no more than a few milliseconds after sending, we can be sure the signal has been received at the other transceiver. Timing with the OAM overhead channel, because of its use of the PMD-TC layer, is much spongier. OAM messages are typically buffered at both the transmitter and the receiver. Defining and controlling exactly when such a message is sent and predicting when it is received is not as straightforward. Thus, a PMD layer signal like Sync Flag is better suited for use as a timing reference.

BRIEF DESCRIPTIONS OF THE DRAWINGS

The above features of the present invention will be more clearly understood from consideration of the following descriptions in connection with accompanying drawings in which.

DETAILED DESCRIPTION OF A PREFERRED EMBODIMENT

Figure 6:
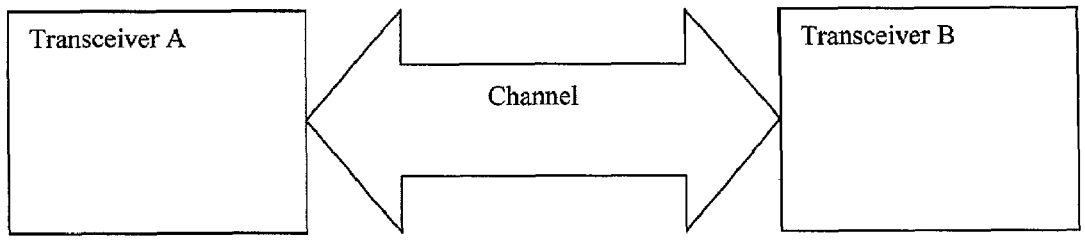
FIG. 6 is a simplified diagram of a known communication system.
Figure 7:
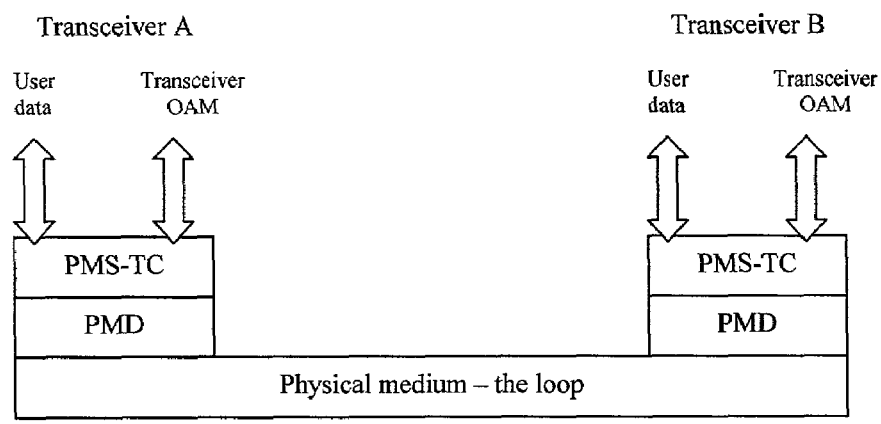
FIG. 7 shows two layers in a communication system as in FIG. 6.
Figure 1A:
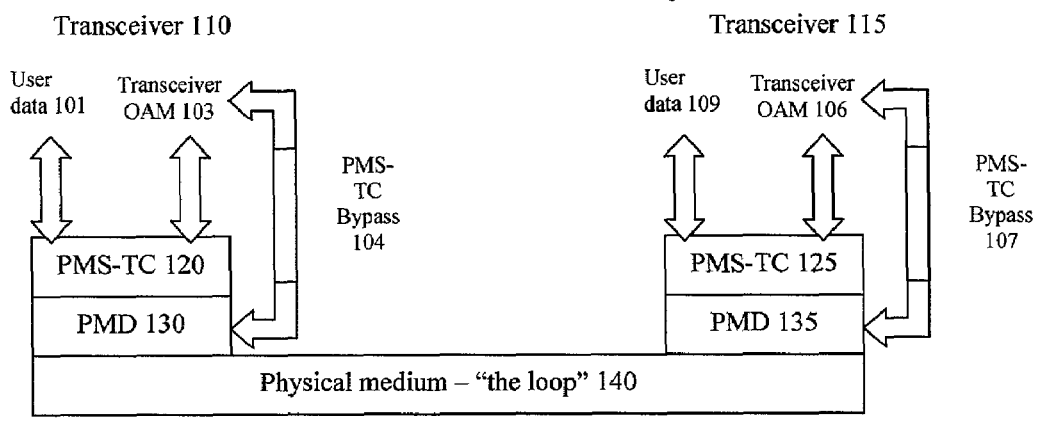
FIG. 1A illustrates a system level view of a DSL system constructed according to principles of the present invention.
Figure 1B:
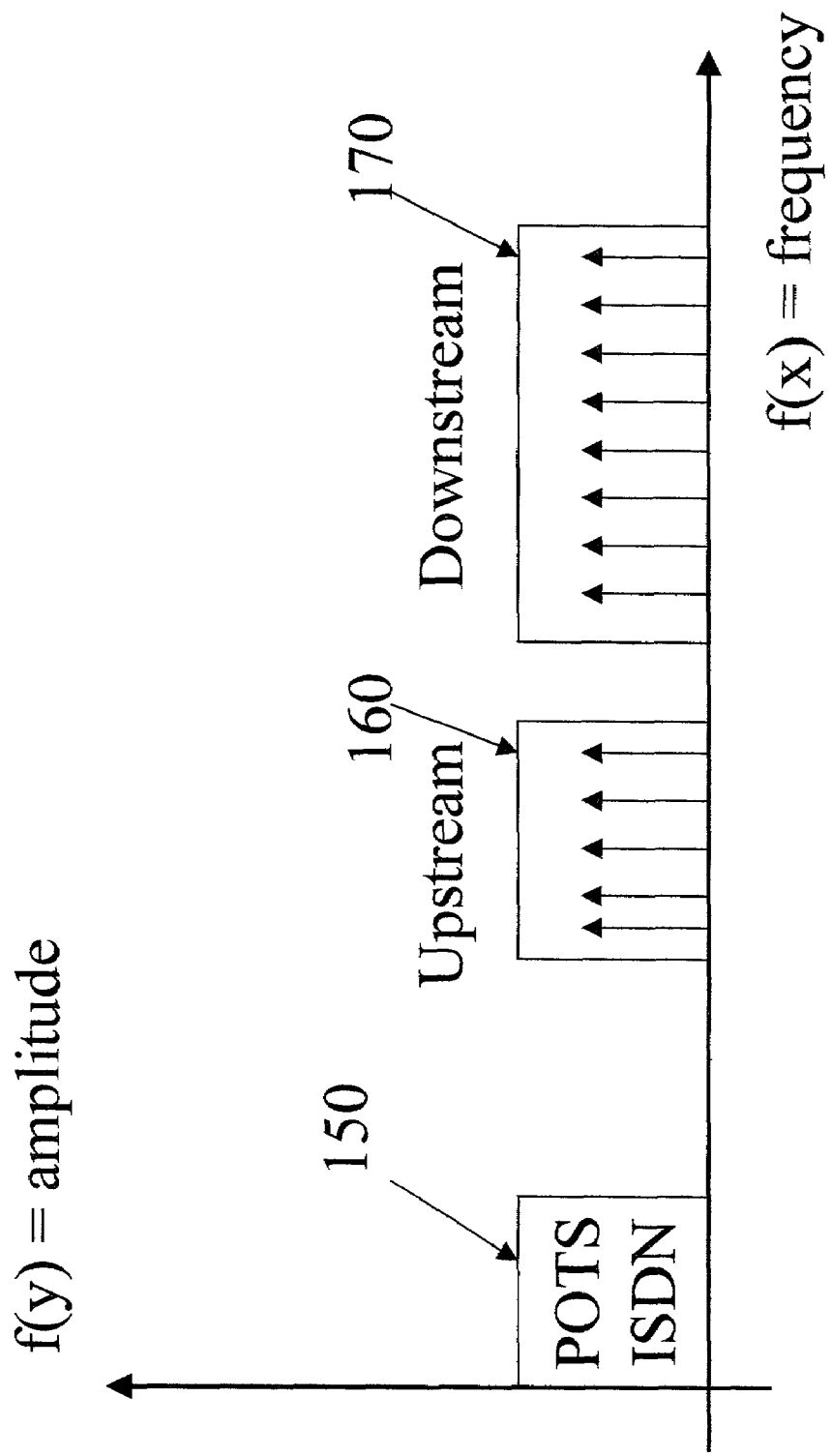
FIG. 1B illustrates the frequency spectrum of an ADSL communication system that can utilize aspects of the present invention.
Figure 2:
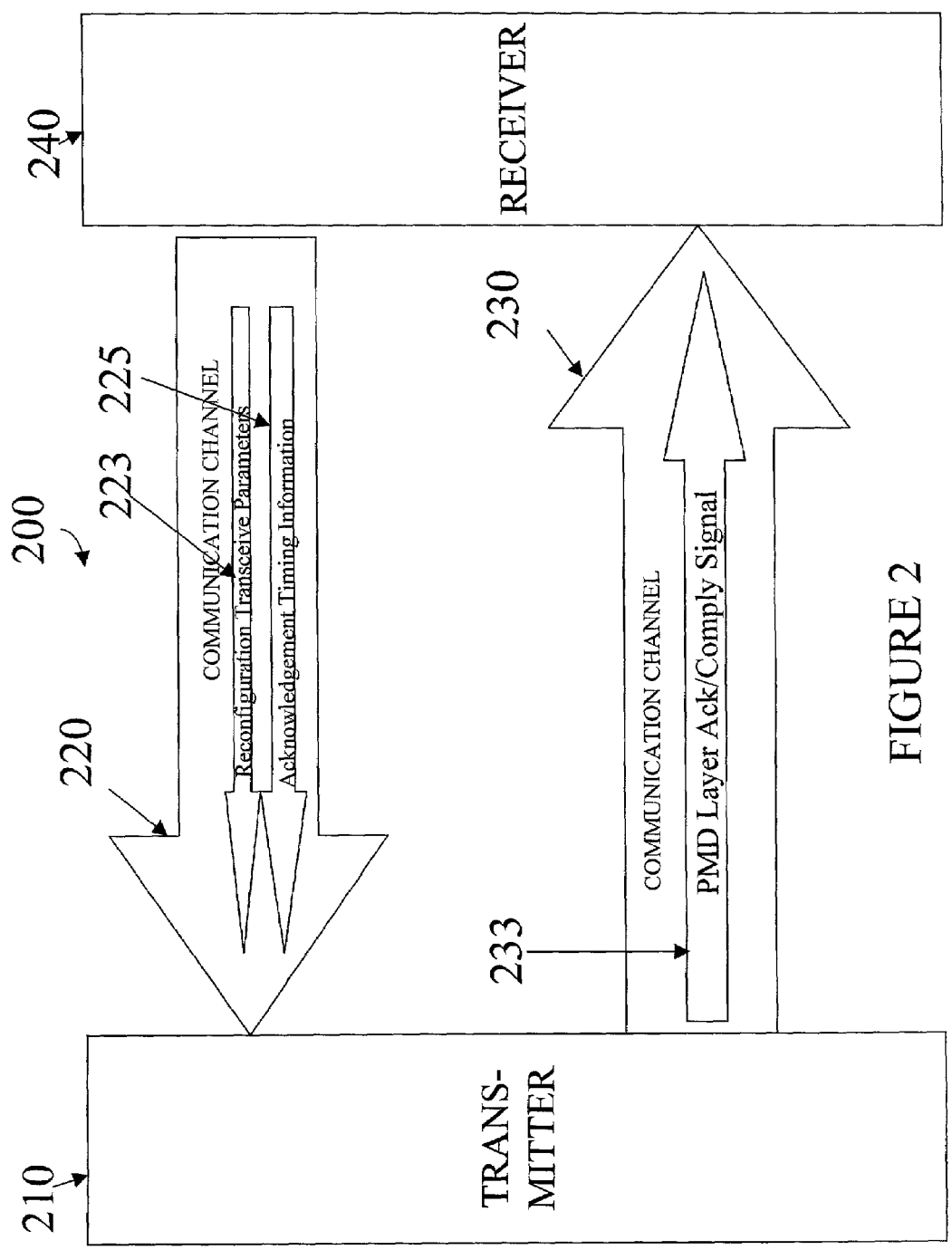
FIG. 2 illustrates one preferred embodiment of an employment of a reconfiguration protocol constructed according to principles of the present invention.
Figure 3:
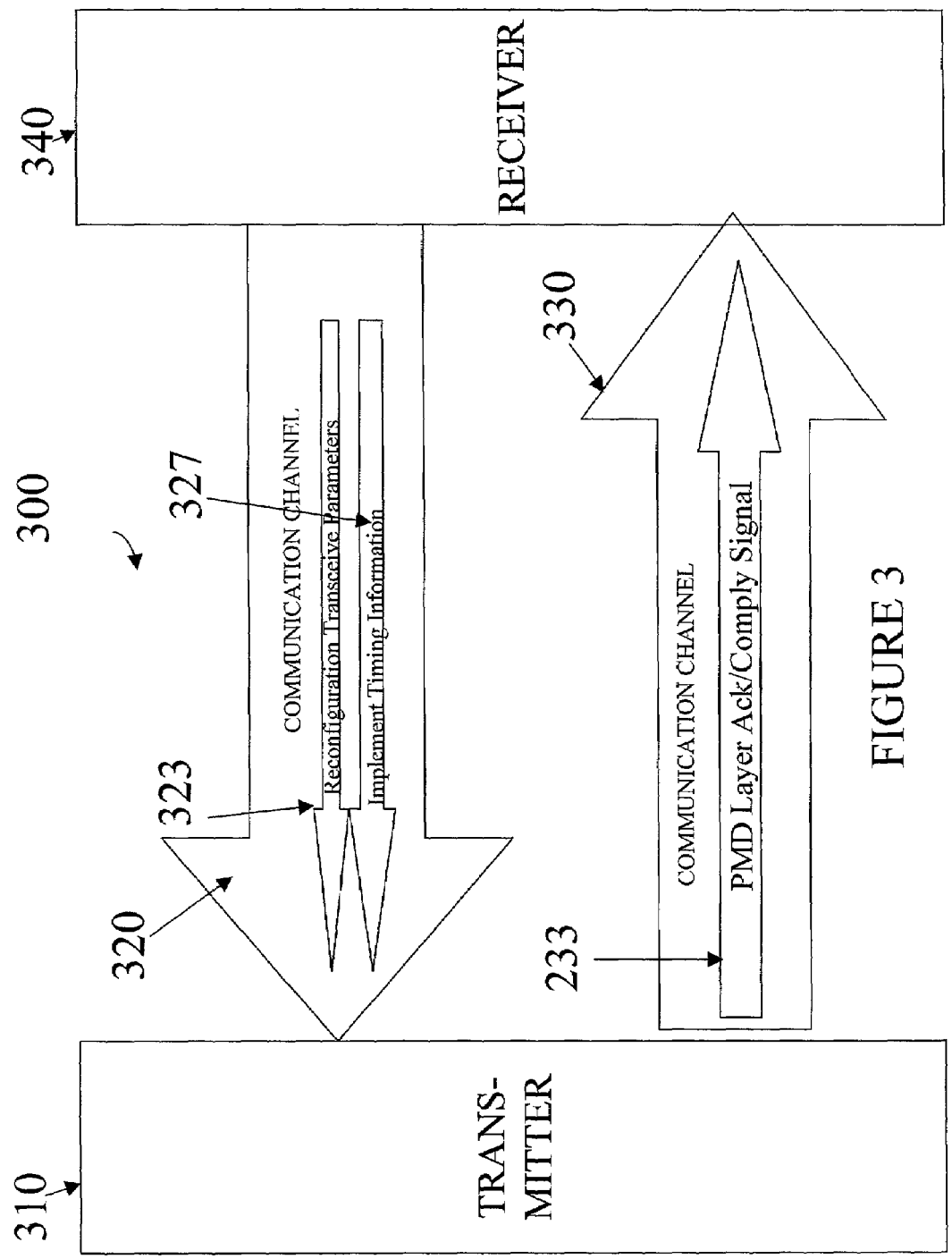
FIG. 3 illustrates a second preferred embodiment of a reconfiguration protocol constructed according to principles of the present invention.
Figure 4:
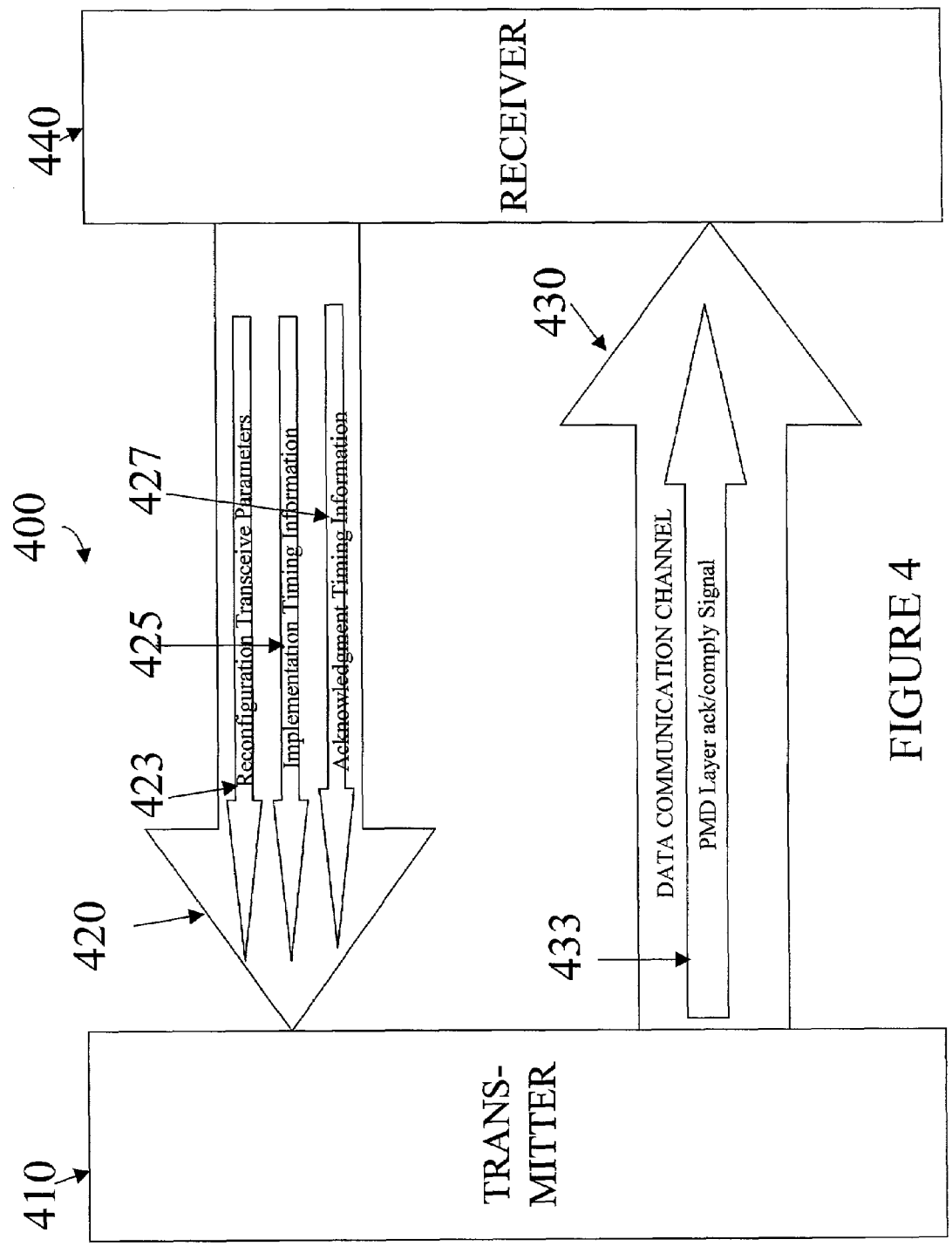
FIG. 4 illustrates a third preferred embodiment of an employment of a reconfiguration protocol constructed according to principles of the present invention.
Figure 5:
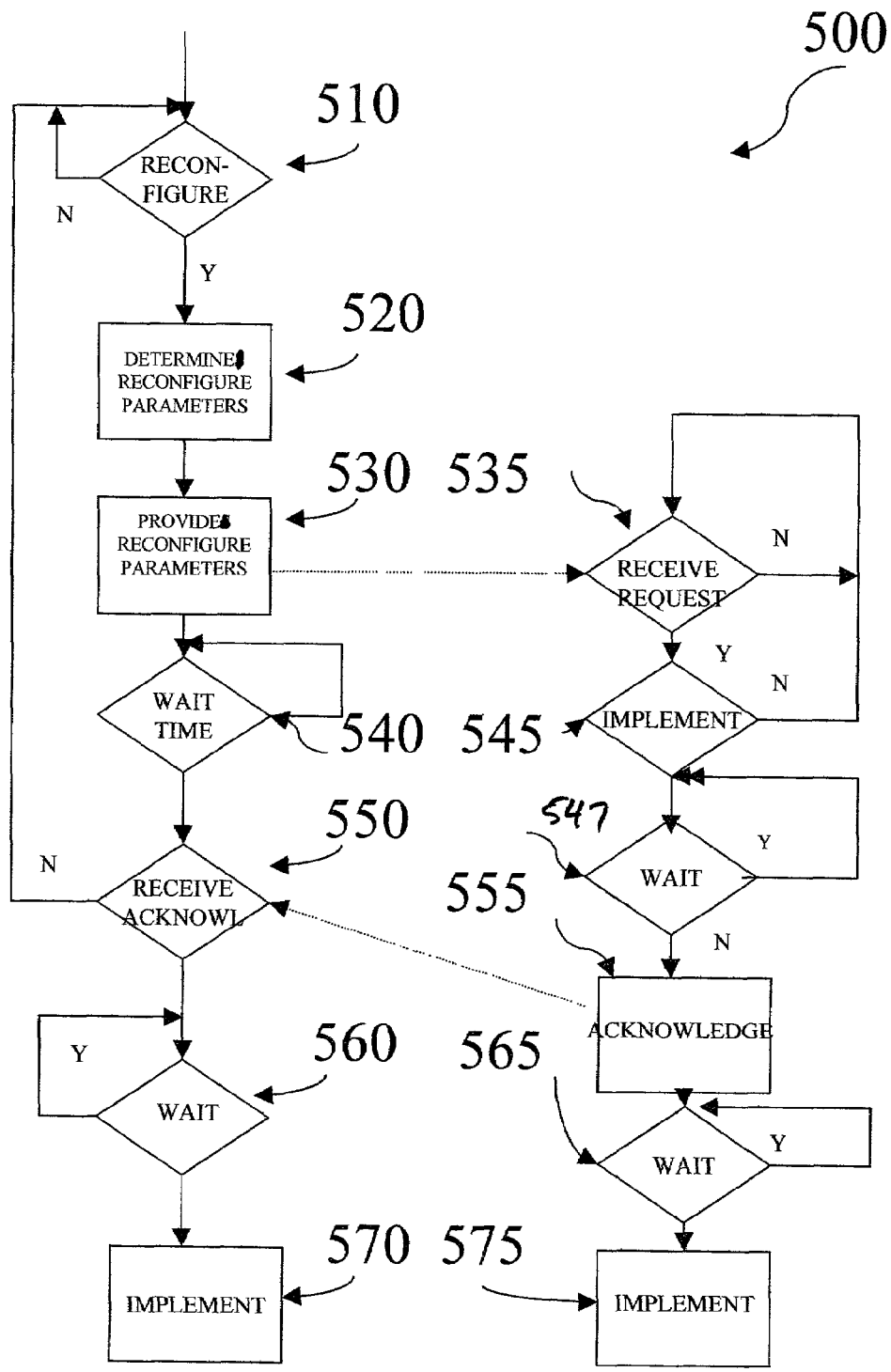
FIG. 5 illustrates a preferred method of use of a DSL system constructed according to principles of the present invention.

The following discussion provides a description of preferred embodiments of the present invention. FIGS. 1a and 1b provide an exemplary context within which aspects of the present invention can be implemented. This system can be similar, with some or all of the described modifications, to that of FIGS. 6 and 7. FIG. 2 then provides an illustration of one preferred embodiment and FIG. 3 provides an illustration of a second preferred embodiment. The first and second preferred embodiments may be used alone or in combination. FIG. 4 is provided to illustrate that the embodiments of FIGS. 2 and 3 are preferably implemented together. Finally, FIG. 5 provides a flow diagram of a preferred implementation of the present invention.

In a preferred embodiment of the present invention, the parameter change request message is sent by transceiver B using the OAM overhead channel, along with new transceive parameters, including a Sync Flag superframe identification (SFlgSf) parameter and a reconfigure implementation delay (Dly) parameter. To signal ack/comply, transceiver A transmits Sync Flag in place of the normal Sync for a particular superframe. The particular Sync Symbol is specified by SFlgSf parameter in the request message from transceiver B. As in U.S. Pat. No. 5,400,322, the transceivers keep a count of both transmitted and received superframes. Actually, this count can be of data symbols, superframe, or other units that provide precise, synchronous time measurement for the communications system.

After acknowledging, transceiver A begins transmitting using the new transceive parameters following the Sync Flag plus delay for implementation specified by Dly parameter in the request message from transceiver B. Additional messages and rules can be defined over the OAM overhead channel to provide additional flexibility and usefulness, such as, No Comply with (or without) a specified reason.

Various embodiments of the invention will now be described.

FIG. 1a illustrates a system level view of a communication system 100 constructed according to principles of the present invention. As an example, the communication system 100 might be a DSL (e.g., ADSL) system or other bi-directional communication system such as a cable modem or wireless system. Aspects of the present invention can be applied to almost any type of framed data communication system protocol. One or the other, or both parameters may provide utility to the application at hand. The names of the parameters change but their inherent functions are the same.

System 100 has a first transceiver 110 coupled to a second transceiver 115 over the physical medium 140. Transceiver 110 can be described using at least two layers, referred to here as PMS-TC layer 120 and PMD layer 130. Similarly, transceiver 115 has PMS-TC layer 125 and PMD layer 135. The OAM channel logically exists between Transceiver OAM 103 and Transceiver OAM 106 through PMS-TC 120, PMD 130, PMD 135, and PMS-TC 125. It is this OAM channel over which parameters are to be sent and received for a reconfiguration of transceive parameters, and certain other synchronization and control parameters. The data communication channel logically exists between User data 101 and User data 109 through the same layers as the OAM channel. The distinction between user data channel and OAM channel is for clarity; they need not have different interfaces to the PMS-TC.

For the purpose of explanation, the following discussion will assume that the communication system 100 is a DSL system. It should be understood, however, that other types of communication systems could also be used.

In an aspect of operation relevant to a first embodiment of the present invention, the second transceiver 115, acting as a receiver, determines whether to request that the first transceiver 110, acting as a transmitter, reconfigure its transceive parameters.

FIG. 1B shows the frequency spectrum for a typical ADSL system. POTS (plain old telephone system) and ISDN (integrated services general networks) occupy a lower range of frequencies 150. Two higher frequency bands 160 and 170 are also provided. Frequency band 160 can be used to transmit upstream data (e.g., from an end user to a service provider) and frequency band 170 can be used to transmit downstream data (e.g., from a service provider to an end user). Bands 160 and 170 may or may not overlap in an ADSL system that utilizes the present invention.

For the purpose of explanation, the following discussion will assume that the first transceiver 110 is functioning as a transmitter and the second transceiver 115 is functioning as a receiver. It is recognized, of course, that in bi-directional systems transceivers 110 and 115 each act as both a transmitter and a receiver.

In current ADSL systems, there is a form of multiplexing upon the physical media 140, in which different sub-carriers (as illustrated by the up-arrows in FIG. 1B) may be carrying data at different data bit rates as transmitted by the transmitter 110. If, for example, the receiver 115 determines that one of the sub-carriers is being subjected to more noise than is acceptable, then the receiver 115 can request a reconfiguration of the channel, e.g., to enable a bit-swap. The receiver 115 will initiate this reconfiguration by transmitting transceive reconfiguration parameters over the OAM channel.

In the first embodiment of the invention, the receiver 115 also determines when the transmitter 110 should ack/comply the request for a change in transceive reconfiguration parameters. The ack/comply response is an indication that the request has been acknowledged and will be complied with. The time at which the transmitter 110 is expected to ack/comply an acceptance of the reconfiguration of transceive parameters is also sent over the OAM channel, from the receiver 115 to the transmitter 110.

If the transmitter is able to implement the change, a PSD layer ack/comply is sent by the transmitter 110 not using the normal OAM channel, but instead over a "PMD only channel" encompassing PMS-TC bypass 104 to PMD 130 over physical medium 140 to the receiver PMD 135 through PMS-TC bypass 106. This path bypasses PMS-TC 120 and PMS-TC 125. If, on the other hand, the transmitter 110 cannot (or will not) implement the change, the transmitter 110 will preferably simply ignore the request in which case no ack/comply will be sent. Alternatively, the transmitter 110 can send a negative ack/comply to refuse the request. This negative acknowledgement and no comply can be sent over either the normal OAM channel or the PMD only channel.

In a second embodiment, the receiver 115 determines how long a delay should be implemented before the transmitter 110 actually implements the change. This delay can be measured, for example, as the time between when the transmitter 110 sends the acknowledgment and the actual implementation of the reconfiguration. The relationship between the receiver 115, the normal OAM channel, the PMD only channel, and the first transceiver 110 will be described in more detail below.

FIG. 2 illustrates one preferred embodiment of an employment of a communication system 200 constructed according to principles of the present invention. A transmitter 210 is coupled via communication channels 220 and 230 to a receiver 240. In FIG. 2, the communication channel 220 is shown communicating information from the receiver 240 to the transmitter 210 while the communication channel 230 is shown communicating information from the transmitter 210 to the receiver 240. This illustration is provided because this represents the flow of information in the preferred embodiment of the present invention. It is recognized that either or both of the channels 220 and 230 are bi-directional in most implementations.

In the preferred embodiment, the request to configure transceive parameters is sent over an OAM overhead channel 220. Accordingly, the OAM channel 220 carries transceive reconfiguration parameters 223. The reconfiguration parameters include an indication of what changes should be made by the transmitting device 210. For example, the reconfiguration parameters may provide the information necessary to implement a bit swap.

Included along with the reconfiguration parameters is ack/comply timing information 225. The ack/comply timing information 225 instructs the transmitter 210 when the transmitter 210 should ack/comply a reconfiguration request 223.

As discussed above, the transmitter 210 can provide this ack/comply 233 on the communication channel 230. The ack/comply 233 can be sent at the time indicated by the ack/comply timing information 225. If the transmitter 210 is not going to implement the changes it may simply ignore the request for reconfiguration of transceive parameters 223.

The ack/comply signal 233 is a PMD layer signal. In a typical system, the PMS-TC layer 120 (FIG. 1A) is the layer where the overhead is generated. These overhead signals are then translated into PMD layer signals to be sent over the physical media. In this context, a PMD layer signal is generated closer to the physical layer. In this case, the ack/comply signal is generated directly in the PMD layer. This can be done relatively easily since only a single piece of information is being sent. With this in mind, it can be said that the ack/comply signal 233 is sent over a lower layer OAM or alternate layer OAM.

In the preferred embodiment, ack/comply signal 233 is provided in the form of a synchronization flag (synch_flag). As is known in the art, a superframe typically includes a synch symbol, which is used to provide synchronization information to the system. A synchronization flag is a particular type of synch symbol that can be readily identified by the system. In other words, the synch flag will not only provide the synchronization and timing information of a synch symbol but also additional control information. In ADSL, the synch symbol is a PMD layer symbol.

The superframe in which the synch_flag is to be sent by the transmitter 210 is determined by the receiver 240 and communicated using the SFlgSf variable within the ack/comply timing information 225. If transmitted, the synch_flag is substituted for, or embedded within, the synch symbol of the given superframe. The synch_flag will typically comprise a radically different bit pattern than the usual synch symbol, thereby making it easier for the receiver 240 to detect the synch_flag.

In one preferred embodiment, the ack/comply timing information 225 is provided as a variable superframe number SFlgSf. The number SFlgSf is a superframe number that the receiver 240 sends to transmitter 210. The transmitter 210 will wait the indicated number of superframes before sending an ack/comply 233. For example, the SFlgSf could be provided to one input of a comparator (not shown), which includes a second input coupled to a counter. The counter will be initiated at the receipt of SFlgSf and incremented at each superframe thereafter. When the counter output equals the SFlgSf, an ack/comply will be sent. As one of ordinary skill in the art will recognize, other implementations are also possible.

Use of the flag SFlgSf provides some advantages. Since the receiver 240 initially determined the ack/comply timing, it will know when to look for the ack/comply. In other words, the receiver 240 only has to look for an ack/comply of a request at a specific and pre-determined time, as indicated by the superframe number SFlgSf. This lightens the load on the receiver 240 (e.g., the receiver does not need to check each superframe) and also lessens the chance of incorrectly detecting the ack/comply. For example, a large noise impulse would have to occur during the one specific time determined by SFlgSf to potentially cause a problem such as failing to detect the ack/comply or falsely detecting an ack/comply that wasn't sent.

FIG. 3 illustrates another embodiment of the present invention. This embodiment can be implemented with or without the ack/comply timing information embodiment described above with respect to FIG. 2.

Similar to the embodiment of FIG. 2, the communication system 300 of FIG. 3 includes transmitter 310, which is coupled to receiver 340 through communication channel 320 and communication channel 330. In this embodiment of the invention, the reconfiguration parameters include implementation timing information 327. This timing information indicates when the reconfiguration should be implemented. The timing information 327 is determined by the receiver and provided to the transmitter. In some embodiments, the transmitter 310 can elect whether or not to implement the reconfiguration depending upon whether the circuitry has enough time to implement the change.

In the preferred embodiment, the implementation timing information is provided as a delay parameter (Dly). The delay Dly is determined by the receiver 340 and indicates when the transmitter 310, as well as receiver 340, is to implement the new reconfiguration transceive parameters 323. In the preferred embodiment, the delay provides the number of superframes to be transmitted between the time the ack/comply is sent and the reconfiguration is implemented. Other frames of reference can alternatively be used. For example, symbols rather than superframes could be counted.

The transmission of Dly by the receiver 340 to the transmitter 310 is an improvement over what was previously known in that, among other things, it gives the receiver 340 flexibility to specify the time it requires to implement a reconfiguration of its receive parameters. For example, small changes require only a small amount of time to reconfigure the receiver while more significant changes require more time. If the implementation delay is constant, then either the system will have to wait unnecessarily before implementing minor changes or will be unable to implement more significant changes using this technique (e.g., without having to perform a full initialization).

As discussed above, the embodiments of FIG. 2 and FIG. 3 can both be included in a single communication system. FIG. 4 has been provided to illustrate just this fact. In the implementation of FIG. 4, the reconfiguration request from the receiver 440 to the transmitter 410 includes not only the reconfiguration parameters but also both the ack/comply timing information 425 and the implementation timing information 427. Preferably, these control signals are all sent over the OAM channel.

The ack/comply 433 is preferably a PMD layer signal, which is sent over a lower layer OAM channel. Preferably, the ack/comply is implemented as a synch flag, as described above with respect to FIG. 2.

In the preferred embodiment, the transmitter 410, after transmitting the ack/comply signal 433 through the communication channel 430, may start using the new transceive reconfiguration parameters effective the first symbol of the superframe count equal to:

(SFlgSf+1+Dly) modulo 256.

FIG. 5 provides a flow chart 500 to illustrate the operation of a communication system according to principles of the present invention. The left side of the flow chart indicates steps (labeled with even reference numerals) to be performed by the receiver 440, while the right side of the flow chart indicates steps (labeled with odd reference numerals) to be performed by the transmitter 410.

In step 510, a receiver 440 determines whether it wishes to request a reconfiguration of the transceive parameters. If the receiver 440 determines that a reconfiguration of transceive parameters is in order, the receiver 440 will calculate the reconfiguration transceive parameters 423 as well as the ack/comply timing information 425 and/or the implementation timing information 427 (step 520). These calculations may be based upon estimates by the receiver 440 on the length of time needed by either the transmitter 410 and/or the receiver 440 to implement the reconfiguration parameters, and the amount of notice needed by both the transmitter 410 and the receiver 440 after the transmission of the ack/comply.

The reconfiguration parameters 423, ack/comply timing information 425 and the implementation timing information 427 are then sent to the transmitter 410 via the OAM channel 420. The transmission is shown as step 530.

The transmitter 410 monitors the OAM channel to determine whether a reconfiguration request is sent. This monitoring is indicated by step 535. The dotted line in the figure is provided to indicate that the request is received after being sent by the receiver 410 in step 530.

After receiving the reconfiguration parameters 423, ack/comply timing information 425 and/or the implementation timing information 427 from the receiver 440, the transmitter determines whether to implement the request for reconfiguration of transceive parameters in step 545. The transmitter 410 may make its decision based upon such criteria as whether the new transceive parameters values are within a valid range that the transmitter can support and whether there is sufficient time to ack/comply given the ack/comply timing information.

If the transmitter 410 determines in step 545 that it will approve the request for reconfiguration of transceive parameters, it will wait the indicated amount of time (step 547) and then acknowledge the request and indicate intent to comply (step 555). In the preferred embodiment, the transmitter acknowledges the request by sending an ack/comply signal 433 to the receiver 410, perhaps in the form of the synch_flag, at the time designated by the receiver 410, perhaps as designated by the value of SFlgSf. If the transmitter 440 decides not to implement the reconfiguration of the transceive parameters, the transmitter will simply return to step 535, and await another request from the receiver 440.

As illustrated by step 540, the receiver 440 waits the predetermined time, possibly measured as a number of superframe counts, to determine if the transmitter 410 has acknowledged the request. At the same time, the transmitter 410 is also waiting the predetermined time in step 547.

After the time has elapsed, the ack/comply is sent by the transmitter 410 (step 555) and received at the receiver 440 (step 550).

Preferably, in the step 550, the receiver 440 determines whether or not the superframe corresponding to flag SFlgSf includes the synch_flag. If the superframe does not have the synch_flag, the receiver will conclude that the transmitter denied the request for reconfiguration of the transceive parameters, and then the receiver will re-execute the reconfiguration step 510.

However, if the ack/comply 433 is received in the correct superframe (e.g., the superframe corresponding to the SFlgSf), both the transmitter 410 and the receiver 440 will wait (in steps 565 and 560, respectively) before transmitting with the new reconfiguration transceive parameters. Step 570 (for the receiver) and step 575 (for the transmitter) indicate the implementation of the parameters.

After the wait period, the transmitter 410 will begin transmitting data across the data communication channel using the new reconfiguration transceive parameters. The wait time is preferably associated with a delay Dly. Likewise, the receiver will be receiving data across the data communication channel using the new reconfiguration parameters.

The preferred embodiment, by employing the SFlgSf parameter, limits the possible location of a valid Sync Flag to a single Sync Symbol period. The receiver only needs to check for Sync Flag at that time, thereby reducing the probability of misdetecting the Sync Flag due to impulse noise. Without this parameter, the receiver must attempt to detect this signal during most or all of the Sync Symbol periods between the time the request message is sent and when the ack/comply protocol times out. For example, in current generation ADSL, the bit swap ack/comply timeout period contains about 23 Sync Symbol periods. With a straightforward detection scheme for Sync Flag, and a similar timeout period for a Sync Flag ack/comply, there would be up to 23 times higher probability of misdetecting Sync Flag in a system without the SFlgSf parameter compared to a system that used the SFlgSf parameter.

As a result of only having to attempt Sync Flag detection on one Sync Symbol period, the computational requirements on the receiver are reduced compared to the case without the parameter which requires the receiver to attempt Sync Flag detection on every Sync Symbol period within the valid timeout window for ack/comply.

The preferred embodiment, by employing the SFlgSf parameter, essentially provides a programmable ack/comply timeout to the protocol. The receiver can tailor the timeout. For example, if the receiver is to request a large set of changes, it may be desirable for the receiver to choose a longer timeout period in order to give the transmitter more time to analyze in order to make a decision whether to comply. Or the receiver may be requesting a change that if it is to occur, must take place very quickly, and want to choose a short ack/comply timeout period. Without this SFlgSf parameter, the protocol uses a fixed timeout that limits the potential usefulness of the protocol.

The preferred embodiment, by employing the delay parameter, provides a programmable implementation delay to the protocol. The receiver can tailor the time allowed for the receiver to act on an ack/comply signal from the transmitter. For example, a particular instance of a receiver might need a certain amount of time to change configuration from one set of transceive parameters to another. Such a receiver might be built at lower cost than one that can make the configuration quicker. The time needed may depend on the particular change desired. Without this delay parameter, a fixed time for changes is demanded and the flexibility in building equipment is thereby restricted.

Additional communication between transceivers can be defined to make further use of the programmability offered by the two parameters SFlgSf and Dly. As just one example, a no comply message could be sent by transceiver A using OAM overhead channel, for example, to indicate the reason it is not complying to the request message from transceiver B, perhaps enabling transceiver A to adjust in response and send a new request message so that transceiver A would comply.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of sharing communication reconfiguration information in a communication system, the method comprising:
   determining reconfiguration transceive parameters for indicating a reconfiguration of a data communication channel;
   determining ack/comply timing information indicating a time at which an ack/comply is expected;
   determining an implementation timing information indicating a time in which the reconfiguration transceive parameter should be implemented after the ack/comply is sent;
   transmitting the reconfiguration transceive parameters and the ack/comply timing information;
   receiving a physical media dependent ack/comply signal indicating whether reconfiguration transceive parameters are to be implemented, the ack/comply signal being received at a time determined by the ack/comply timing information;
   and implementing the reconfiguration transceive parameters in response to the ack/comply signal, the reconfiguration transceive parameters being implemented at a time in accordance with the implementation timing information.

2. The method of claim 1 wherein receiving a physical media dependent ack/comply signal comprises receiving an ack/comply signal that is encoded within a synch symbol.

3. The method of claim 1 wherein the ack/comply timing information comprises an indication of a specific synch symbol.

4. The method of claim 1 and further comprising implementing the reconfiguration transceive parameters in response to the ack/comply signal.

5. The method of claim 1 wherein the reconfiguration transceive parameters and the ack/comply timing information are transmitted over an OAM channel.

6. The method of claim 1 wherein the reconfiguration transceive parameters include information to implement a bit swap.

7. A method of sharing communication reconfiguration information in a communication system that includes a communication channel, the method comprising:
   receiving reconfiguration transceive parameters indicating a reconfiguration of the communication channel;
   receiving ack/comply timing information indicating a time at which an ack/comply is expected;
   receiving an implementation timing information indicating a time in which the reconfiguration transceive parameter should be implemented after the ack/comply is sent;
   transmitting an ack/comply over a lower layer OAM channel, wherein the ack/comply indicating whether the reconfiguration transceive parameters will be implemented;
   and implementing the reconfiguration transceive parameters in response to the ack/comply signal, the reconfiguration transceive parameters being implemented at a time in accordance with the implementation timing information
   the ack/comply being transmitted at a time determined by an ack/comply timing information.

8. The method of claim 7 wherein the ack/comply is transmitted within a symbol.

9. The method of claim 7 wherein the reconfiguration transceive parameters and the ack/comply timing information are received over an OAM channel.

10. The method of claim 7 wherein the reconfiguration transceive parameters include information to implement a bit swap.

11. A method of sharing communication reconfiguration information in a communication system, the method comprising:
    determining reconfiguration transceive parameters for indicating a reconfiguration of a data communication channel;
    determining implementation timing information indicating a time at which the reconfiguration transceive parameters should be implemented after an ack/comply is sent;
    tranmitting the reconfiguration transceive parameters and the implementation timing information; and
    receiving the ack/comply indicating whether reconfiguration transceive parameters are to be implemented; and
    responsive to the ack/comply indicating whether the reconfiguration transceive parameters are to he implemented, implementing the reconfiguration transceive parameters et a time in accordance with the implementation timing information after the ack/comply is sent.

12. The method of claim 11 and further comprising determining ack/comply timing information indicating a time at which an ack/comply is expected and transmitting the ack/comply timing information.

13. The method of claim 12 wherein the ack/comply being received at a time determined by the a ok/comply timing information.

14. The method of claim 11 wherein the ack/comply is received over a lower layer OAM channel.

15. The method of claim 14 wherein receiving an ack/comply comprises receiving an ack/comply that is encoded within a synch symbol.

16. The method of claim 15 wherein the acknowledgment timing information comprises an indication of a specific synch symbol.

17. The method of claim 11 wherein he reconfiguration transceive parameters and the implementation timing information are transmitted over an OAM channel.

18. The method of claim 11 wherein the reconfiguration transceive parameters include information to implement a bit swap.

19. A communications system, comprising:
a transmitter that transmits data to a receiver over a communication channel;
wherein the receiver determines reconfiguration transceive parameters, ack/comply timing information and implementation delay timing information and provides the reconfiguration transceive parameters, ack/comply timing information and implementation delay timing information to the transmitter;
wherein the transmitter returns an ack/comply to the receiver at a time in accordance with the ack/comply timing information; and
wherein, in response to the acknowledgment indicating acceptance of the reconfiguration transceive parameters, both the transmitter and the receiver implement the reconfiguration transceive parameters at a time in accordance with the implementation delay timing information after the ack/comply is returned.

20. The communications system of claim 19 where the communication channel comprises a data channel and an OAM channel, the data being transmitted on the data channel.

21. The communications system of claim 20 wherein the transmitter returns the ack/comply over a lower layer OAM channel.

22. The communications system of claim 21 wherein the acknowledgment is part of a synch symbol.

23. The communications system of claim 22 wherein the acknowledgment timing information comprises an indication of a specific synch symbol.

24. The communications system of claim 20 wherein the receiver provides the reconfiguration transceive parameters, ack/comply timing information and implementation delay timing information over the OAM channel.

25. The communications cystem of claim 19 wherein the communications system is an ADSL system.

26. The communications system of claim 19 wherein the reconfiguration transceive parameters include information to implement a bit swap.

27. A communication device comprising:
means for determining reconfiguration transceive parameters for indicating a reconfiguration of a communication channel;
means for determining ack/comply timing information indicating a time at which an ack/comply is expected;
means for determining an implementation delay timing information indicating a time in which the reconfiguration transceive parameter should be implemented after the ack/comply is sent;
means for transmitting the reconfiguration transceive parameters and the ack/comply timing information;
means for receiving a physical media dependent ack/comply signal indicating whether reconfiguration transceive parameters are to be implemented, the ack/comply being received at a time determined by the ack/comply timing information;
and means for implementing the reconfiguration transceive parameters in response to the ack/comply signal, the reconfiguration transceive parameters being implemented at a time in accordance with the implementation timing information.

28. A communication device comprising:
means for receiving reconfiguration transceive parameters for indicating a reconfiguration of a communication channel;
means for receiving implementation delay timing information indicating a time at which the reconfiguration transceive parameter should be implemented after an ack/comply is sent;
means for receiving ack/comply timing information indicating a time at which the ack/comply is expected;
means for transmitting an ack/comply over a lower layer OAM channel, the ack/comply indicating whether the reconfiguration transceive parameters will be implemented, the ack/comply being transmitted at a time determined by an ack/comply timings information;
and means for implementing the reconfiguration transceive parameters at a time in accordance with the implementation delay timing information.

29. An ADSL communication system, comprising:
a receiver configured to
determine reconfiguration transceive parameters for both the receiver and a transmitter and
notify the transmitter of the reconfiguration transceive parameters, the reconfiguration transceive parameters including an indication of a bit swap; and
determine ack/comply timing information, the ack/comply timing information comprising a specific reconfigure superframe count in which the transmitter is to ack/comply the reconfiguration transceive parameters if the transmitter chooses to reconfigure after a notification;
an OAM channel for transmitting both the reconfiguration transceive parameters and the specific reconfigure superframe count from the receiver to the transmitter;
a lower layer OAM channel for transmitting an acknowledgment from the transmitter to the receiver if the transmitter chooses to reconfigure, the acknowledgement comprising a synch_flag transmitted at the specific reconfigure superframe count;
a data channel for transmitting data from the transmitter to the receiver; and
wherein both the transmitter and the receiver implement the reconfiguration transceive parameters and utilize said parameters to communicate data over the data channel, the implementation performed in response to the synch_flag after a delay of a number of superframe count equal to a superframe delay parameter determined by the receiver.

30. A method of sharing communication reconfiguration information in a communication system, the method comprising;
determining reconfiguration transceive parameters for indicating a reconfiguration of a communication channel, wherein the communication system comprises an asymmetric digital subscriber line system and wherein the reconfiguration transceive parameters including information to implement a bit swap;
determining ack/comply timing information indicating a time at which an ack/comply is expected, the acknowledgment timing information comprising an indication of a specific synch symbol;

determining implementation timing information indicating a time in which the reconfiguration transceive parameters should be implemented after the ack/comply is sent;

transmitting the reconfiguration transceive parameters and the ack/comply timing information, wherein the reconfiguration transceive parameters and the ack/comply timing information are transmitted over an OAM channel;

receiving the reconfiguration transceive parameters;

receiving the ack/comply timing information;

receiving the implementation delay information, the reconfiguration parameters, the ack/comply timing information and the implementation delay information being received over the OAM channel;

transmitting a PMD layer ack/comply signal over a lower layer OAM channel, the ack/comply signal indicating whether the reconfiguration transceive parameters will be implemented, the ack/comply being transmitted at a time determined by the ack/comply timing information, the ack/comply being encoded within a synch symbol;

receiving over the lower layer OAM channel the ack/comply; and implementing the reconfiguration transceive parameters, the reconfiguration transceive parameters being implemented after a delay of a time in accordance with the implementation timing information after the ack/comply is received.

31. A method of reconfiguring connection parameters of a communication channel between a transmitting modem and a receiving modem, the method comprising:

at the transmitting modem, receiving an online reconfiguration request for reconfiguring the connection parameters of the communication channel from the receiving modem, wherein the request includes at least reconfiguration parameters, a sync flag superframe number (SFlgSf) and a superframe reconfiguration delay number (SfDly):

acknowledging the request by transmitting a sync flag in a superframe having a count equal to the sync flag superframe number (SFlgSf): using the reconfiguration parameters effective a superframe whose count is equal to {(SFlgSf+1+SfDly) modulo 256}, whereinthe SfDly is a non-negative integer;

implementing the reconfiguration parameters at both the transmitting and receiving modems; and utilizing the reconfiguration parameters to communicate data over the communication channel.

32. A method according to claim 31, wherein the transmitting and receiving modems are ADSL modems, and the superframe reconfiguration delay number SfDly is less than or equal to four.

* * * * *